UNITED STATES PATENT OFFICE.

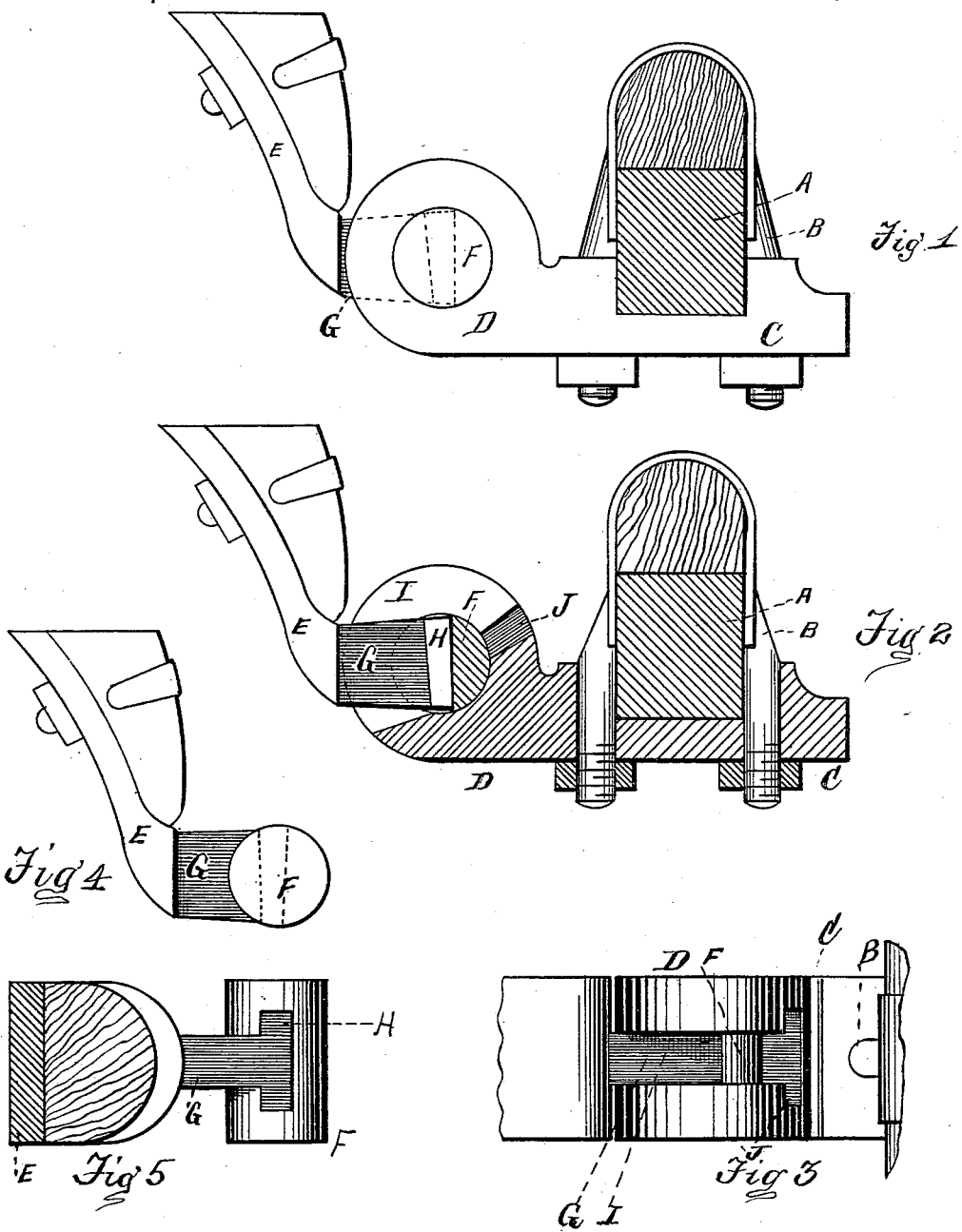

AMOS GIPE, OF ROANN, INDIANA.

THILL-COUPLING.

SPECIFICATION forming part of Letters Patent No. 259,302, dated June 13, 1882.

Application filed January 12, 1882. (No model.)

*To all whom it may concern:*

Be it known that I, AMOS GIPE, of Roann, Wabash county, Indiana, have invented certain new and useful Improvements in Thill-Couplings, of which the following is a specification, reference being had to the accompanying drawings, in which—

Figure 1 is a side elevation of the complete coupling; Fig. 2, a vertical section of the same; Fig. 3, a plan of the same; Fig. 4, a side elevation of shank with journal-cylinder attached, and Fig. 5 a plan of the same.

This invention relates to that class of couplings for vehicle shafts and tongues in which the uncoupling is performed by raising the shafts or tongue to a high position and then disengaging the shaft or tongue shanks through proper outlet-ports in the bearing; and it consists of the novel form of construction hereinafter described and claimed.

In the drawings, A is the axle, shown in section; B, the clip; and C, the coupling-heel, which unites to the axle in the usual manner.

D is the bearing of the coupling. Through it is bored a journal-hole, and in its upper part is cut the groove I, leading down to the journal-hole and extending across most of the upper portion of the boss forming the bearing. At the extremity of this groove nearest the axle the groove is broadened, as at J, thus giving the groove a T-formed termination.

E is the tang of the shaft or tongue. H is a wedge-shaped block, from the side of which projects the shank G, joining the block to the tang.

F is the journal-cylinder, adapted to fit properly into the bearing, and it has cut through it a T-shaped slot to fit the block H and shank G. When the cylinder is in place upon the shank it forms a cylindrical head for the shank G, as shown in the drawings.

In operating the coupling the cylinder E is put in place in the bearing and set so that its T-slot will correspond with the T part of the groove in the bearing. The shafts are then raised and the blocked shanks inserted through J into their seats in the cylinders F. The shafts are then lowered into working position, as shown in Figs. 1 and 2, in which the block H stands about vertical.

It will be seen that the work and wear are, by this construction, brought upon the surface of the cylinder F and not upon the ends or edges of the block H, as would be the case were it constructed with its edge joining the shank G. The slot in the cylinder and the block H having a wedge form, these parts can be fitted very closely without interfering with their being easily coupled and uncoupled.

Couplings having cylinder-joints with tangs detachable from the cylinder are in common use; but many of them have a bearing confined to the narrow edge of a T-shaped piece against the inner surface of the bearing, or else, in case the cylinder itself is caused to bear the strain, the parts are very difficult of construction and deficient in means for causing the cylinder to expand and fill the bearing. Such couplings soon become loose, and many forms of cushions and springs have been devised in connection with them to compensate for the looseness of the practically-solid cylinders.

I claim as my invention—

The combination, with slotted bearing D, of the cylinder F, having wedge-shaped T-slot vertically and entirely through it, and shank G, having vertical wedge-shaped block H, substantially as and for the purpose specified.

AMOS GIPE.

Witnesses:
J. E. TILMAN,
JAMES W. ARTHUR.